Figure 1:
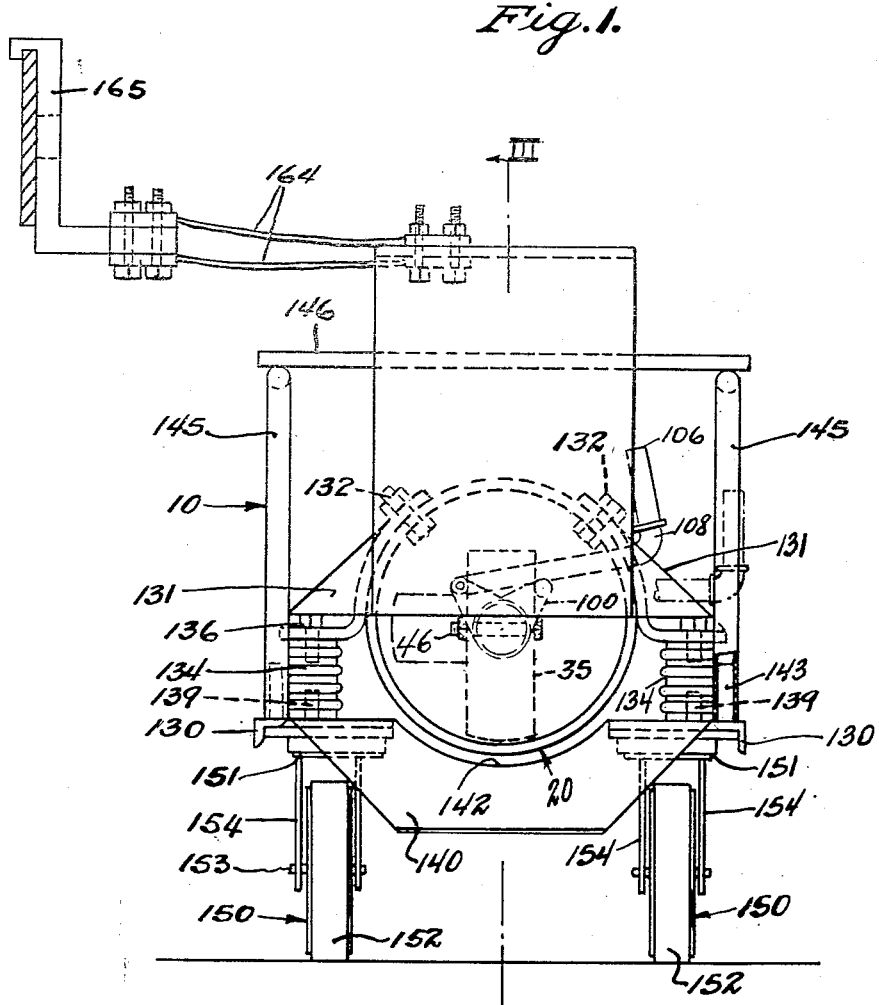

Aug. 18, 1953   J. L. MICHAELIS   2,649,510
PORTABLE JACK UNIT FOR ELECTRIC CIRCUITS
Filed July 12, 1950   4 Sheets-Sheet 1

Inventor
JOHN L. MICHAELIS

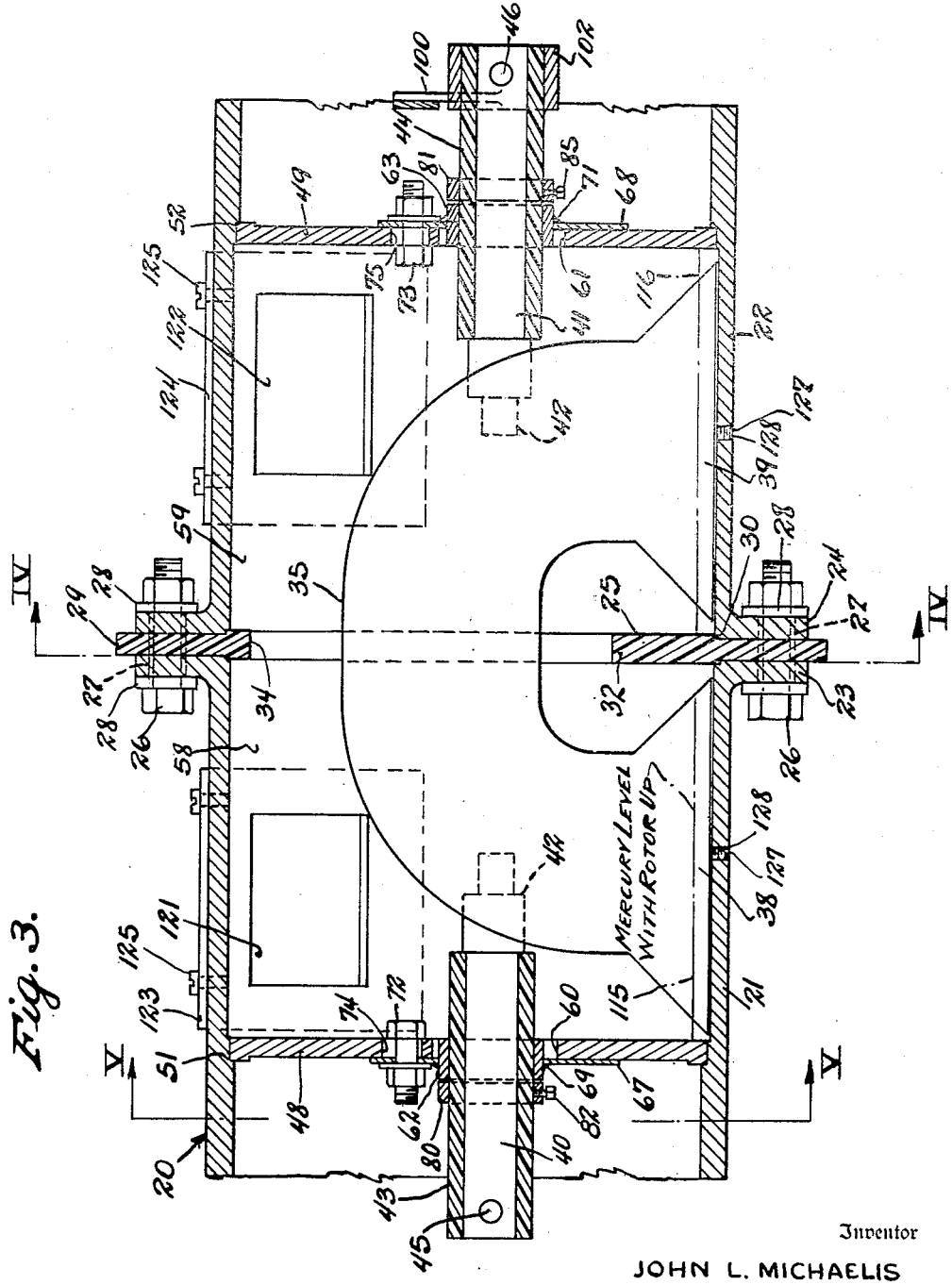

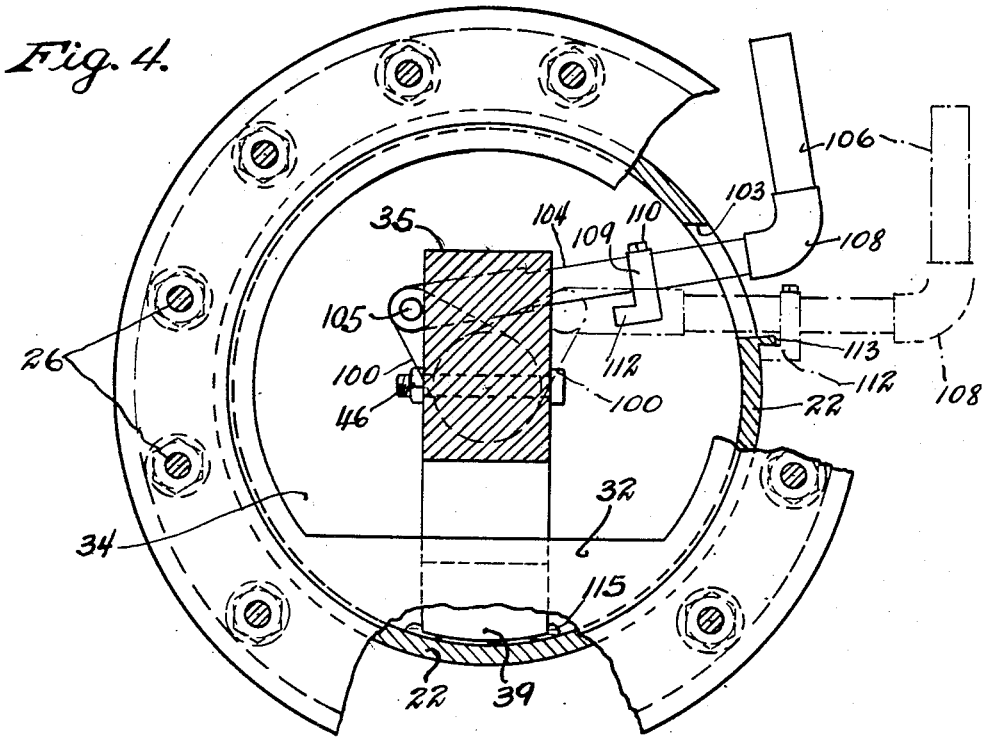
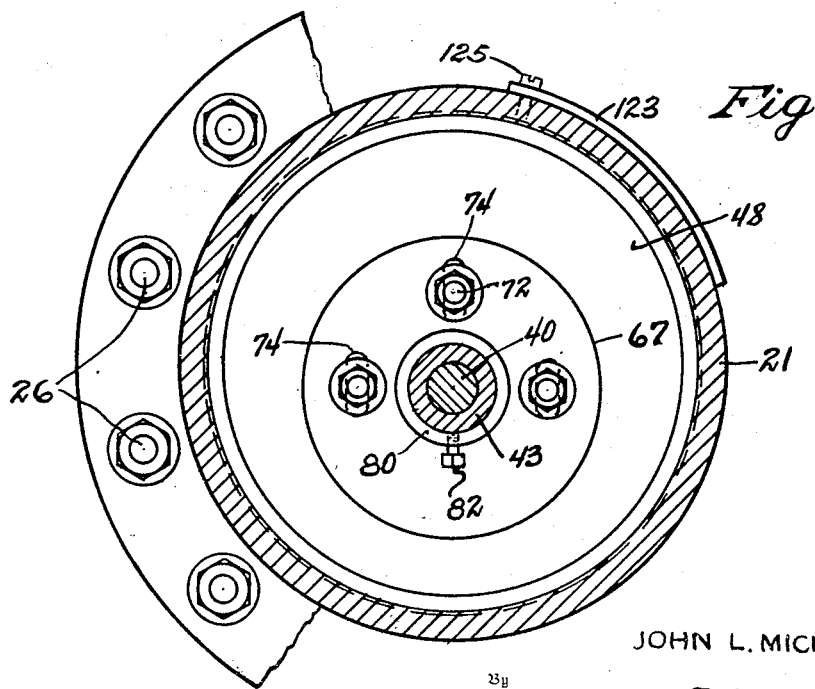

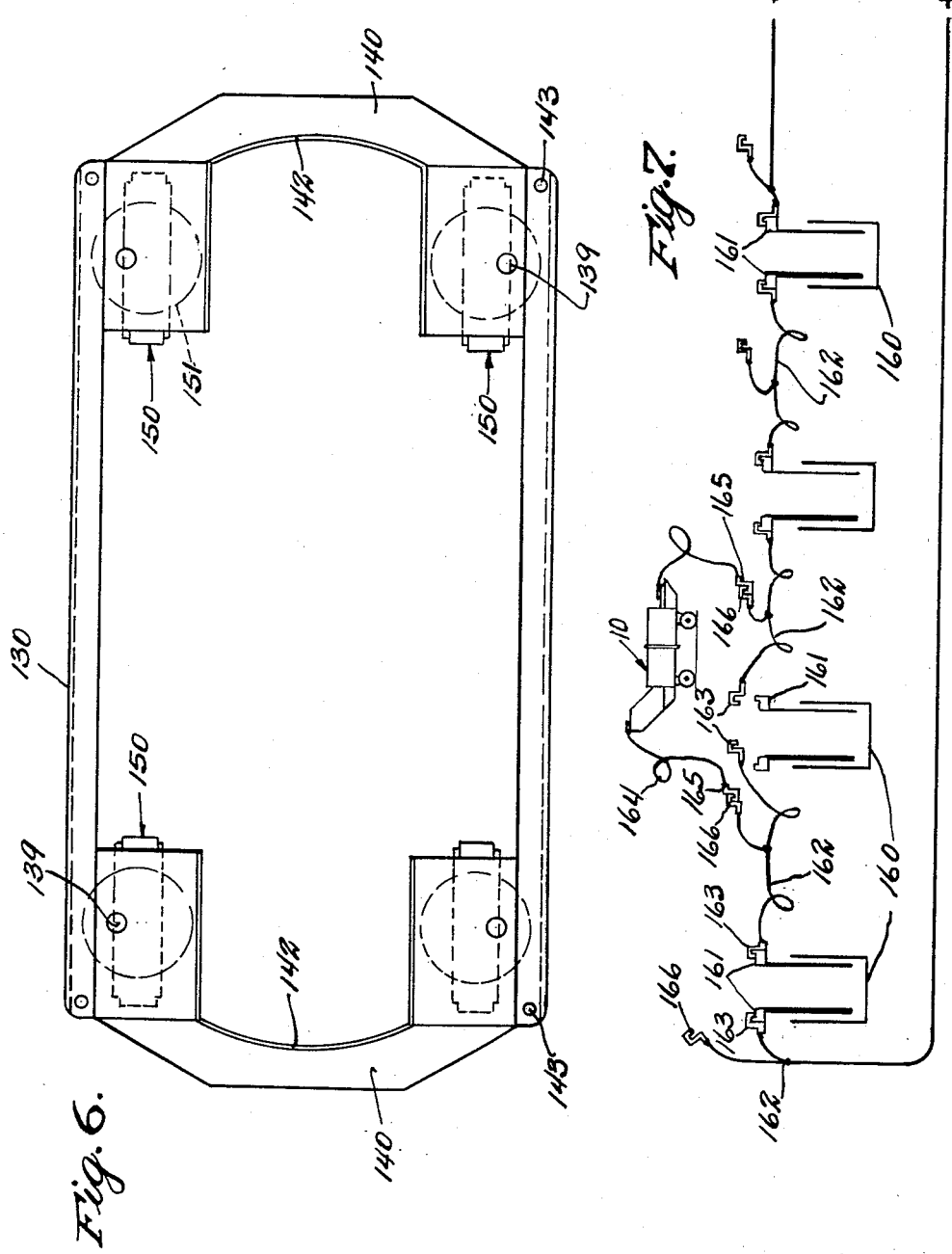

Patented Aug. 18, 1953

2,649,510

UNITED STATES PATENT OFFICE 2,649,510

PORTABLE JACK UNIT FOR ELECTRIC CIRCUITS

John L. Michaelis, New Martinsville, W. Va., assignor, by mesne assignments, to Columbia-Southern Chemical Corporation, Pittsburgh, Pa., a corporation of Delaware Application July 12, 1950, Serial No. 173,376

6 Claims. (Cl. 200—2)

This invention relates to electric control elements employed in the operation of electrochemical cells linked in series or to other electrical operations of analogous character, and it has particular relation to the structure and arrangement of a portable shunting unit, including a switch for maintaining series connection while an electrochemical cell in the series is being replaced or repaired.

One object of the invention is to provide an improved switch or shunt unit adapted to accommodate high currents and also adapted to be temporarily substituted for a cell in a line of electrochemical cells arranged in series.

Another object of the invention is to provide an improved switching and shunting unit having exceptional resistance to corrosion and to collection of foreign matter such as dirt, dust, etc., and which is readily adapted to be connected in an electric series.

Another object of the invention is to provide an improved switching and shunting unit interchangeable for connection at various locations in an electric circuit and capable of effectively dissipating heat involved in the operation thereof.

Another object of the invention is to provide an improved switching and shunting unit which can be readily dismantled, cleaned and re-assembled.

In certain industries, such as the chlorine caustic industry, extensive use is made of electrochemical cells arranged in series and connected to a source of electric energy, for example, of 600 volts with approximately 3 to 5 volts across each individual cell. Then 10,000 to 20,000 D. C. amperes are passed through all of the cells in series, the amount depending upon the size and design of the particular cells.

In operations of this kind each cell deteriorates daily to a certain degree and hence cell repairs become an important factor in proper maintenance, and in the efficiency of operation of the installation. It has been found that from time to time, usually at regular intervals, it is necessary to replace a number of cells in order to insure a proper state of repair in all of the equipment.

In order to facilitate the repair and replacement necessary, I have designed a mobile, compact, high ampere and low voltage switch or jack which is operable to cut out or short-circuit individual cells so that one or more of the cells can be repaired or removed or replaced without interrupting production with reference to the remainder of the cells in the circuit. It is necessary to efficiency and practical operation that the switching or shunting unit for this purpose be highly reliable. Otherwise, the equipment may be seriously damaged. Also, such a unit must be highly resistant to corrosion and capable of operation under conditions that vary greatly.

The apparatus described below is designed to fulfill all of the requirements noted above. The jack unit is included in a carriage or buggy so as to be readily movable to and from various cells. The working parts of the jack are enclosed and are substantially free from corrosion, from foreign particles, and from other deterioration to which equipment of this kind is generally subjected. The actual electric contacts for the switching unit involve the use of thin films of mercury cooperating in a novel manner with circuit making and breaking elements. It is only necessary to transport the carriage unit to one of the cells, secure the electric connections and then operate the switch to cut out the cell from the influence of the electric circuit. In this way the cell can be repaired or removed without inconvenience.

Figure 2:
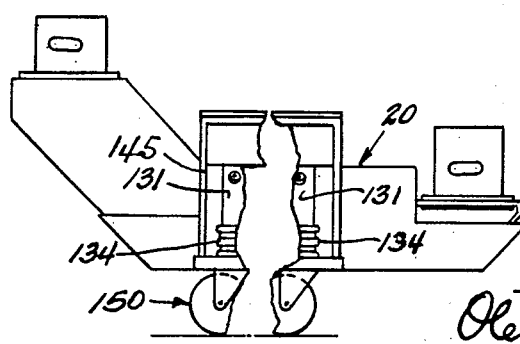

In the drawing:

Fig. 1 is an end elevation of a jack unit in which one form of the invention has been incorporated; Fig. 2 is a fragmentary side elevation, on a smaller scale, of the structure shown in Fig. 1; Fig. 3 is a fragmentary vertical section, on a larger scale, taken substantially along the line III—III of Fig. 1; Fig. 4 is a fragmentary transverse vertical section taken substantially along the line IV—IV of Fig. 3; Fig. 5 is a fragmentary transverse vertical section taken substantially along the line V—V of Fig. 3; Fig. 6 is a plan of a skeleton frame structure included in the structure shown in Fig. 1; and Fig. 7 is a diagram illustrating electric wiring and connections of electrochemical cells arranged in series.

One structural arrangement of jack unit 10 designed to illustrate the invention includes a sectional tubular body 20 composed of copper sections 21 and 22. These sections are formed with radial flanges 23 and 24, respectively, between which outer marginal portions of a perforated plate 25 of insulating material is rigidly secured by means of bolts 26 extending through the flanges and through such marginal portions of the plate. The plate 25 can be composed of a resinous composition; for example, a material known under the name of "Macarta" has been found to be satisfactory. Suitable bushings 27 and washers 28 connected to the bolts insulate the sections 21 and 22 from each other and serve as additional insulation with respect to the central plate 25. The edge of the plate 25 projects outwardly slightly beyond the clamping flanges 23 and 24 of the tubular sections, as indicated at 29.

In order to facilitate the fitting together of these members in coaxial relation, circular shoulders 30 are formed upon opposite sides of the insulating plate 25 to provide rabbeted joints between the plate and the sections at the location of the radial flanges. A lower wall portion 32 (Figs. 3 and 4) of the plate extends upwardly to provide a partition or dam across the lower portion of the circular body of the unit. An opening 34 above this wall section 32, and which is partially defined thereby, is sufficiently large to accommodate a copper rotor 35 which is freely movable in the opening. Spaced contact feet 38 and 39 at the opposite end portions of the rotor are disposed in depending relation in the lower portions of the tubular sections 21 and 22, respectively. The lower or bottom surfaces of the contact feet 38 and 39 are curved to correspond substantially to the curvature of the adjacent lower inside surfaces of the tubular sections and are slightly spaced from the latter surfaces. The spacing between opposed surfaces of the feet 38—39 and the inner cylindrical surfaces is uniform when the feet 38—39 are in their lower position. The rotor is roughly of inverted U-shape and the partition wall section or dam 32 normally projects upwardly toward the bight or intermediate portion of the U-shaped rotor with the feet disposed on opposite sides of the dam materially below the upper edge thereof.

Supporting shafts 40 and 41 of copper are secured, as indicated at 42, by cementing or soldering to opposite end portions of the rotor and are coaxially aligned horizontally. However, the common axis of these shafts 40 and 41 is disposed materially below the horizontal axis of the aligned tubular sections 21 and 22. These horizontal copper shafts are encased in insulating tubes 43 and 44 that are rigidly secured thereto by means of pins 45 and 46.

Parallel copper discs 48 and 49 spaced on opposite sides of the partition 25 are mounted transversely and vertically adjacent outer end portions of, and inside, the tubular sections 21 and 22, respectively. Shouldered portions 51 and 52 formed circumferentially on the inner walls of the sections facilitate the centering and locating of these discs which are firmly secured in place by sweating, or by other methods of connection, so as to insure a rigid and fluid tight fitting around the circumferential extent of these elements. Two adjacent chambers 58 and 59 on opposite sides of the central partition 25 are thus defined by such partition and the walls of the discs 48 and 49.

The shafts 40 and 41, with the insulating tubes 43 and 44 thereon, extend through relatively large openings 60 and 61 formed centrally through the partition discs 48 and 49, respectively. Bearing sleeves 62 and 63 surround the insulating tubes so as to rotatably support the latter together with the assembled rotor and shaft elements. Radial annular flanges 67 and 68 on the bearing sleeves are secured thereto by welding, as indicated at 69 and 71, respectively. These flanges are mounted on the discs 48 and 49 by means of bolts 72 and 73 extending therethrough and through vertically disposed slots 74 and 75 that are formed in the respective partition discs 48 and 49. These bolts 72 and 73, and with them the discs 67 and 68 which carry the bearing sleeves 62 and 63, can be adjusted vertically in the slots so as to position the common axis of the shafts 40 and 41 properly with respect to the axis of the tubular sections 21 and 22 and thus insure precision in spacing the bottoms of the contact feet 38 and 39 from the inner bottom surfaces of the copper sections 21 and 22. This spacing has been found to be satisfactory at a value of approximately 1/64 of an inch. In this arrangement, when the rotor is turned about the axis of its supporting bearings 62 into a horizontal plane containing such axis, the contact feet are spaced farther from the inner surfaces of the tubular sections 21 and 22. This spacing progressively increases as the rotor approaches the horizontal plane. Suitable collars 80 and 81 are fitted around and are rigidly secured upon the insulating tubes 43 and 44 adjacent the outer ends of the bearing sleeves 62—63 to prevent lateral or axial displacement of the insulating tubes from the bearing sleeves 62 and 63. Fastening devices 82 and 85 secure the collars 80 and 81 upon the insulating tubes.

One of the supporting shafts 41 has a crank arm 100 secured thereto by means of the pin 46 which extends through the tube 44, shaft 41 and also through a collar 102. This collar forms a rigid part of the crank arm structure, and is fitted around the insulating tube 44. An opening 103 in the wall of the tubular section 22 receives an actuating bar 104 that has a pin 105 at its inner end pivotally securing the latter upon the outer end portion of the crank arm 100. An upright handle 106 of insulating material is rigidly mounted by means of a pipe elbow connection 108 upon the outer end portion of the actuating bar 104 on which the elbow connection is also rigidly mounted. A collar 109 is adjustable on the bar 104 by means of a set screw 100 threaded into the collar and engageable with the bar for the purpose of properly locating a latch 112 that is integral with the lower side of the collar. The latch 112 can be hooked behind a lug 113 that is integrally formed on the section 22 adjacent the lower extremity of the opening 103. By operating the bar 104 the angular position of the crank arm 100, together with the angular position of the rotor 35, can be varied with respect to the axis of the shafts 40—41.

It is to be understood that the rotor is actuated rotatably through an angle of approximately 90° when the bar 104 is actuated outwardly until the latch 112 is held behind the lug 113. In this position the contact feet 38 and 39 are raised and spaced materially from the lower inner surfaces of the tubular sections 21 and 22. These contact feet are thus withdrawn from contact with pools of mercury 115 and 116 that are contained in the lower portions of the tubular sections 21 and 22, respectively, and that are separated and insulated from each other by the upright wall or dam 32 of the central partition 25. In order to restore contact, the bar 104 and crank arm 100 are operated to reverse actuation of the rotor through 90° of rotation to the position shown in full lines of Fig. 4. The contact feet are brought into contact with the pools of mercury 115 and 116 which provide thin films between the adjacent surfaces. As indicated above, this thin film is only approximately 1/64 of an inch in thickness with reference to each contact. The electric circuit through the rotor and tubular sections 21 and 22 can thus be efficiently completed or broken, depending upon the rotation of the rotor 35.

If desired, windows 121 and 122 can be cut in the walls of the tubular sections 21 and 22, respectively, and covered by means of closures 123 and 124 that are secured to these sections by means of suitable removable fasteners 125.

It is to be understood that the tubular sections 21 and 22 are to be maintained substantially in horizontal position and that the rotor, which is somewhat flat, is normally vertically aligned, that is, substantially in a vertical plane containing the horizontal axis of the tubular sections. Such position insures proper functioning of the apparatus, especially while the contact feet are in their lower or circuit-completing position.

Facilities for supplying and draining mercury from the tubular sections 21 and 22 are provided by means of openings 127 into which screw threaded plugs 128 are removably applied. These plugs are mounted in the lowermost portions of the sections as shown in Fig. 3.

In the structural arrangement of each jack unit 10, a unitary carriage frame 130 of more or less rectangular form is provided to support the tubular body 20 and its associated elements. Straps 131 (Figs. 1 and 2) are bolted, as indicated at 132, to opposite end portions of the tubular body and these straps project laterally and from opposite sides of the tubular body so as to rest upon cushions 134 of insulating material, such as rubber composition. These cushions are arranged adjacent the four corners of the frame 130. Each of the straps 131 is provided with a downwardly projecting pin 136 which extends centrally and partially through the cushion with which it is associated. The pins 136 are rigidly mounted upon the straps 131; for example, they can be in the form of screw threaded bolts threaded through the straps. Likewise, a pin 139 extending upwardly and rigidly mounted upon each corner portion of the frame 130 is aligned with a companion downwardly projecting pin 136. Two pins 136 and 139 of each cushion are substantially axially and vertically aligned although their opposed ends are spaced materially to insure proper insulating thickness in the cushions between the pins. The frame 130 is in skeleton form as shown in Fig. 6 so as to provide an open central space entirely surrounded by the framework and in which the tubular body is suspended.

Opposite ends of the frame are formed with downwardly and outwardly inclined aprons 140 the inner edges of which are downwardly curved, as indicated at 142, and spaced from the similarly curved bottom portions of the tubular body 20 without affecting the bracing and strengthening character of these aprons.

Four dowel pins 143 are also rigidly mounted adjacent the four corners of the frame 130 and project vertically to receive end portions of an inverted U-shaped tubular framing 145 on opposite sides of the jack unit. The lower ends of the U-shaped framing are removably fitted upon the dowel pins. This framing 145 supports a cover 146 which can be removed at will by the operator.

Conventional casters 150 are mounted adjacent the four corners of the frame upon swivel connections 151. Each caster includes a wheel 152 rotatable upon an axle 153 that is mounted transversely between flanges 154 which form the caster fork.

The jack unit 10 is easily operable so as to be applicable to any one of a series of electrochemical cells 160 diagrammatically shown in Fig. 7. The several cells are provided with electrical connection elements 161 and suitable wiring 162 through which the several cells 160 are normally linked in series. This wiring system also includes conventional electrical connection elements 163 detachably engageable with the elements 161. Likewise, the jack unit is provided with conductors 164 upon which electric connection elements 165 are secured for engagement with similar connection elements 166 that are included in the wiring system 162. Thus the jack unit can be connected to any one of the cells to short-circuit or cut out such cell, which then can be repaired or replaced. The connections can be manipulated to maintain the series relation among the adjacent cells and through the jack while the repairs or substitutions are being made.

It is to be understood that the several insulating elements 26, 27, 28, 43, 44 and 106 are composed of material of the type referred to in the description of the plate 25.

Although only one form of the invention has been shown and described in detail, it will be apparent to those skilled in the art that the invention is not so limited but that various modifications can be made therein without departing from the spirit of the invention or from the scope of the appended claims.

I claim:

1. An electric control device comprising a portable carriage, a horizontally disposed tubular switch body having conductors connected thereto and engageable interchangeably in shunting relation with electric connections in any of a plurality of electrochemical cells connected in series in an electric circuit, means for supporting the tubular body on the carriage, mercury in the lower portion of the tubular body, a circuit making and breaking rotor movable into and out of contact with said mercury, said rotor and tubular body having complemental surfaces in close proximity in the position of circuit making and defining a film of mercury between said surfaces to complete an electric circuit through said rotor and tubular body the complemental surfaces defining said film covering an area extending at least a major portion of the axial length of the tubular body, and means for moving the rotor out of contact with the mercury.

2. A portable switch comprising a pair of elongate containers arranged in end to end relation, insulation normally separating the containers with respect to transmission of electric current, mercury disposed in each container and the latter having an inner surface area of predetermined contour on which the mercury is disposed, a circuit making and breaking device having outer surface areas corresponding in contour to the respective inner surface areas and movable into uniformly spaced relation to said inner surface areas, each inner surface area and the corresponding outer surface area defining a film of mercury between them in their position of uniformly spaced relation, the film of mercury extending longitudinally of the elongate containers a major portion of the lengths thereof and extending laterally on opposite sides of the lower midportions of the containers, and means for actuating the making and breaking device into and out of contact with the mercury.

3. A portable switch comprising a pair of cylindrical metal containers disposed in end to end relation, insulation normally separating the containers with respect to transmission of electric current, mercury disposed in each container along an inner cylindrical surface area in the bottom thereof, a circuit making and breaking device having outer cylindrical surface areas corresponding in contour to the inner cylindrical surface areas on which the mercury is disposed and said outer surface areas being movable into uniformly spaced and substantially concentric relation to the respective inner surface areas, each inner surface area and the corresponding outer surface area defining a cylindrical film of mercury between them, and each cylindrical film extending in an axial direction of the cylindrical surfaces a distance greater than the width of the cylindrical film, and means for actuating the making and breaking device into and out of contact with the mercury.

4. An electric switching and shunting structure comprising a pair of adjacent metal containers having concave inner bottoms, insulation electrically separating said containers, mercury contained in each concave bottom, bearings carried in said structure and axially aligned substantially horizontally, a rotor of conducting material rotatably mounted in said bearings and having convex depending portions normally disposed in uniformly spaced opposed relation to the respective inner concave surfaces and the respective opposed surfaces and defining films of mercury between them, the axis of said bearings being in a position offset downwardly from the axis of curvature of the bottom of the containers to increase the distance between the rotor and walls of the containers in response to rotation of the rotor away from its position of uniformly spaced relation to the respective inner concave surfaces and means for rotating the rotor into and out of contact with the mercury.

5. An electric switching and shunting structure comprising a pair of adjacent metal containers having concave inner bottoms, insulation electrically separating said containers, the contour of each concave bottom being generated with respect to a horizontal axis, mercury contained in each concave bottom, bearings having adjustable mountings in said structure and axially aligned substantially horizontally, a rotor of conducting material rotatably mounted in said bearings and having convex depending portions normally disposed in uniformly spaced and opposed relation to the respective inner concave surfaces, the respective opposed surfaces defining films of mercury of uniform thickness between them, the axis of generation of such concave surfaces being spaced above and substantially parallel to the axis of the rotor bearings, and means for rotating the rotor out of and into contact with the mercury.

6. An electric switching and shunting structure comprising a pair of adjacent metal containers having concave inner bottoms, a wall of insulation electrically separating said containers and having an opening therein spaced upwardly from the lower adjoining portions of said containers, a conductor connected to each container, the contour of each concave bottom being generated with respect to a horizontal axis, mercury contained in each concave bottom, bearings carried in said structure and axially aligned substantially horizontally, a rotor of conducting material rotatably mounted in said bearings and having convex depending portions normally disposed in uniformly spaced and opposed relation to the respective inner concave surfaces, the space between the respective opposed surfaces defining films of mercury of uniform thickness, said rotor extending through the opening in said wall, the axis of generation of said concave surfaces being spaced above and substantially parallel to the axis of the rotor bearings, and means for rotating the rotor out of and into contact with the mercury.

JOHN L. MICHAELIS.

References Cited in the file of this patent

UNITED STATES PATENTS

| Number | Name | Date |
|---|---|---|
| 773,123 | Christmas | Oct. 25, 1904 |
| 1,265,551 | Thomson | May 7, 1918 |
| 2,501,345 | MacNeill et al. | Mar. 21, 1950 |

FOREIGN PATENTS

| Number | Country | Date |
|---|---|---|
| 634,175 | Germany | Aug. 19, 1936 |